(12) United States Patent
Mondal et al.

(10) Patent No.: US 11,085,309 B2
(45) Date of Patent: Aug. 10, 2021

(54) OUTER DRUM ROTOR ASSEMBLY

(71) Applicant: General Electric Company, Schenectady, NY (US)

(72) Inventors: Bhaskar Nanda Mondal, Bangalore (IN); Ramana Reddy Kollam, Bangalore (IN)

(73) Assignee: General Electric Company, Schenectady, NY (US)

( * ) Notice: Subject to any disclaimer, the term of this patent is extended or adjusted under 35 U.S.C. 154(b) by 223 days.

(21) Appl. No.: 15/712,234

(22) Filed: Sep. 22, 2017

(65) Prior Publication Data

US 2019/0093489 A1 Mar. 28, 2019

(51) Int. Cl.

| | |
|---|---|
| *F01D 5/30* | (2006.01) |
| *F01D 1/26* | (2006.01) |
| *F01D 5/02* | (2006.01) |
| *F01D 5/03* | (2006.01) |
| *F02C 3/067* | (2006.01) |
| *F01D 5/06* | (2006.01) |
| *F01D 1/24* | (2006.01) |

(52) U.S. Cl.
CPC ............. *F01D 5/3069* (2013.01); *F01D 1/24* (2013.01); *F01D 1/26* (2013.01); *F01D 5/02* (2013.01); *F01D 5/03* (2013.01); *F01D 5/06* (2013.01); *F01D 5/3053* (2013.01); *F02C 3/067* (2013.01); *F01D 5/3061* (2013.01); *F05D 2220/32* (2013.01); *F05D 2240/24* (2013.01); *F05D 2250/44* (2013.01); *F05D 2260/30* (2013.01)

(58) Field of Classification Search
CPC .... F01D 5/3069; F01D 5/3053; F01D 5/3061; F01D 5/03; F01D 5/06; F01D 5/02; F01D 1/24; F01D 1/26; F05D 2220/32; F05D 2240/24; F05D 2250/44; F05D 2260/30; F02C 3/04; F02C 3/067
See application file for complete search history.

(56) References Cited

U.S. PATENT DOCUMENTS

| | | |
|---|---|---|
| 3,085,396 A | 4/1963 | Kent et al. |
| 3,451,215 A | 6/1969 | Barr |
| 3,746,469 A | 7/1973 | Mason |
| | (Continued) | |

FOREIGN PATENT DOCUMENTS

| | | |
|---|---|---|
| DE | 102016203567 A1 | 9/2017 |
| EP | 0631041 A1 | 12/1994 |
| | (Continued) | |

OTHER PUBLICATIONS

European Search Report EP Application 181923806 dated Feb. 15, 2019.

(Continued)

*Primary Examiner* — Woody A Lee, Jr.
*Assistant Examiner* — Jesse M Prager
(74) *Attorney, Agent, or Firm* — Dority & Manning, P.A.

(57) ABSTRACT

The present disclosure is directed to an outer drum rotor assembly for a gas turbine engine including a first outer drum and a second outer drum. Each outer drum defines a radially extended flange adjacent to one another. A plurality of outer drum airfoils is extended inward along the radial direction from between the first outer drum and the second outer drum at the flange.

19 Claims, 7 Drawing Sheets

(56) References Cited

U.S. PATENT DOCUMENTS

| | | | |
|---|---|---|---|
| 3,850,546 A * | 11/1974 | Mason | F01D 5/066 |
| | | | 416/212 R |
| 4,720,236 A | 1/1988 | Stevens | |
| 5,402,638 A | 4/1995 | Johnson | |
| 5,404,713 A | 4/1995 | Johnson | |
| 5,443,590 A | 8/1995 | Ciokajlo et al. | |
| 5,988,980 A | 11/1999 | Busbey et al. | |
| 6,711,887 B2 | 3/2004 | Orlando et al. | |
| 8,366,378 B2 | 2/2013 | Beckford et al. | |
| 8,656,589 B2 | 2/2014 | Kurt-Elli | |
| 8,721,293 B2 | 5/2014 | Arilla et al. | |
| 8,894,368 B2 * | 11/2014 | Jones | F01D 5/225 |
| | | | 416/191 |
| 9,133,855 B2 | 9/2015 | Borufka et al. | |
| 2004/0020186 A1 * | 2/2004 | Orlando | F01D 5/03 |
| | | | 60/226.1 |
| 2004/0086377 A1 * | 5/2004 | Proctor | F01D 1/26 |
| | | | 415/116 |
| 2009/0022593 A1 | 1/2009 | Oka | |
| 2012/0244001 A1 * | 9/2012 | Belmonte | F01D 5/3015 |
| | | | 416/204 A |
| 2015/0226075 A1 | 8/2015 | Aoki et al. | |
| 2015/0354502 A1 | 12/2015 | Kuhne et al. | |
| 2016/0195010 A1 | 7/2016 | Roberge | |
| 2019/0055856 A1 | 2/2019 | Barow et al. | |

FOREIGN PATENT DOCUMENTS

| | | | | |
|---|---|---|---|---|
| EP | 0900920 B1 | | 8/2007 | |
| FR | 900378 A | * | 6/1945 | ............ F01D 5/3069 |
| FR | 1053118 A | * | 2/1954 | ............ F01D 5/3069 |
| GB | 586563 A | | 3/1947 | |
| GB | 856561 A | | 12/1960 | |
| GB | 2151714 A | | 7/1985 | |
| JP | S61226502 A | | 10/1986 | |
| JP | H07145741 A | | 6/1995 | |
| JP | 2007/247406 A | | 9/2007 | |
| JP | 2012/512360 A | | 5/2012 | |

OTHER PUBLICATIONS

Machine Translated Japanese Office Action Corresponding to Application No. 2018168542 dated Nov. 14, 2019.

* cited by examiner

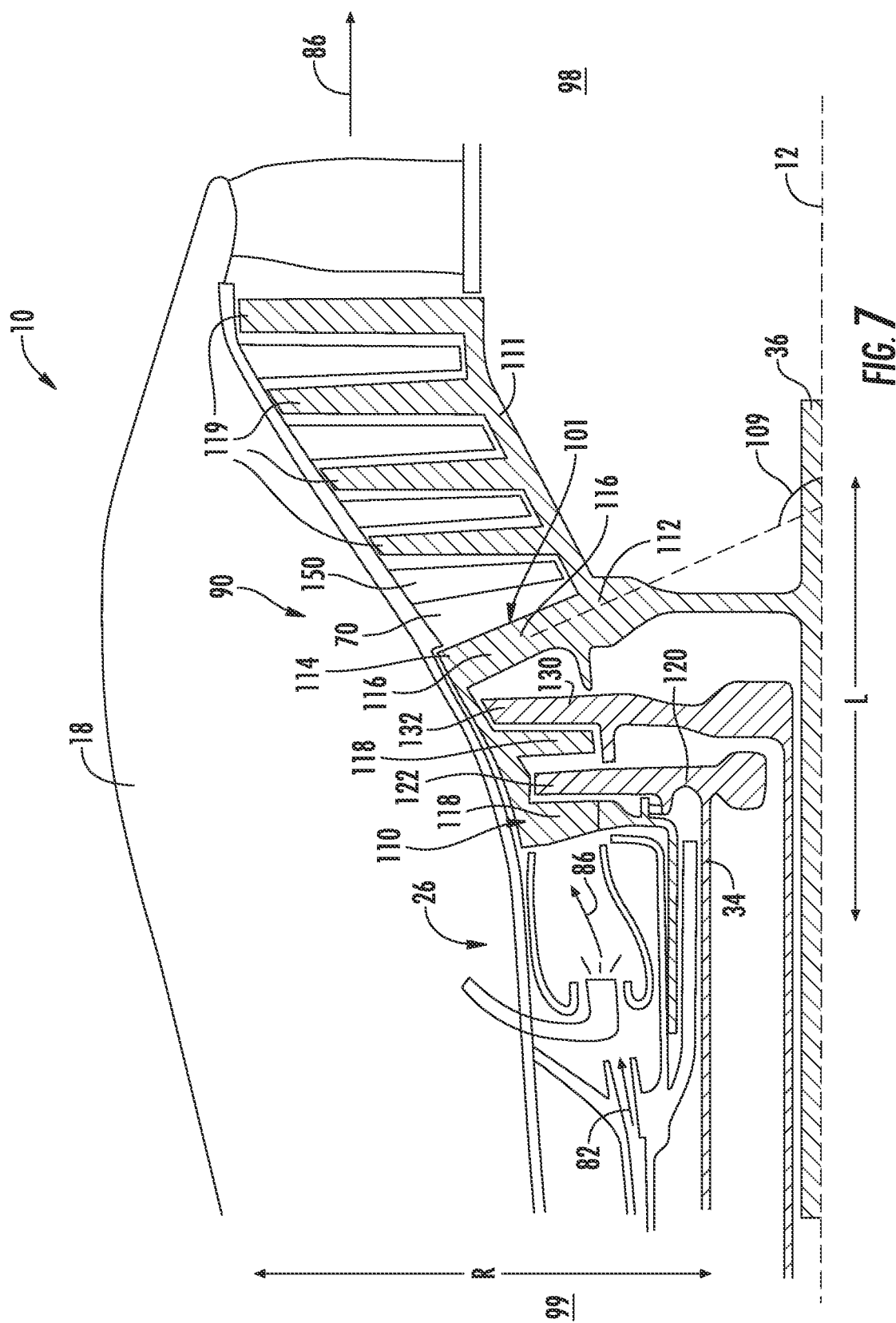

OUTER DRUM ROTOR ASSEMBLY

FIELD

The present subject matter relates generally to gas turbine engine architecture. More particularly, the present subject matter relates to an outer drum rotor assembly.

BACKGROUND

Gas turbine engines generally include a turbine section downstream of a combustion section that is rotatable with a compressor section to rotate and operate the gas turbine engine to generate power, such as propulsive thrust. General gas turbine engine design criteria often include conflicting criteria that must be balanced or compromised, including increasing fuel efficiency, operational efficiency, and/or power output while maintaining or reducing weight, part count, and/or packaging (i.e. axial and/or radial dimensions of the engine).

Interdigitated compressor and turbine sections are known to take advantage of relatively high fluid velocities between sequential stages of rotating airfoils without vanes therebetween. However, known interdigitated compressor and turbine sections are limited by axial, radial, thermal, and/or mechanical loads from the inner radii of the interdigitated compressor and turbine sections, which may limit a quantity of stages that may be included in an interdigitated outer drum rotor. Still further, known interdigitated turbine sections are limited to interdigitated a low pressure turbine rotor and an intermediate pressure turbine rotor.

Therefore, there exists a need for a structure that may reduce or remove limits to outer drum rotor size and structural life due to axial, radial, thermal, and/or mechanical loads.

BRIEF DESCRIPTION

Aspects and advantages of the invention will be set forth in part in the following description, or may be obvious from the description, or may be learned through practice of the invention.

The present disclosure is directed to an outer drum rotor assembly for a gas turbine engine including a first outer drum and a second outer drum. Each outer drum defines a radially extended flange adjacent to one another. A plurality of outer drum airfoils is extended inward along the radial direction from between the first outer drum and the second outer drum at the flange.

In various embodiments, the outer drum rotor assembly further includes a disk coupled to an inner diameter of the plurality of outer drum airfoils. In one embodiment, the disk defines a first retaining wall extended along the radial direction disposed adjacent to the plurality of outer drum airfoils along a longitudinal direction. The first retaining wall provides retention of the plurality of outer drum airfoils along the longitudinal direction. In another embodiment, the disk defines a cooling passage extended therethrough at least partially along the longitudinal direction. In still various embodiments, the outer drum rotor assembly further includes a retaining ring coupled to the disk. The retaining ring defines a wall extended along the circumferential direction and along the radial direction adjacent along the longitudinal direction to the plurality of outer drum airfoils. The retaining ring provides retention of the plurality of outer drum airfoils along the longitudinal direction. In yet another embodiment, the disk defines a plurality of slots extended along a longitudinal direction through which the plurality of outer drum airfoils is disposed. The plurality of slots provides retention of the plurality of outer drum airfoils along a circumferential direction and the radial direction. In still various embodiments, the disk is an integral annular structure.

In various embodiments, the plurality of outer drum airfoils are each extended along the radial direction at an angle relative to an axial centerline. In one embodiment, an outer radial end of the plurality of outer drum airfoils is upstream along the longitudinal direction relative to an inner radial end of the plurality of outer drum airfoils.

In another embodiment, the plurality of outer drum airfoils, the first outer drum, and the second outer drum each define an opening through which a mechanical fastener extends. The mechanical fastener couples the plurality of outer drum airfoils, the first outer drum, and the second outer drum together.

In various embodiments, each outer drum airfoil defines an airfoil flange extended outward along the radial direction and at least partially along the circumferential direction. In one embodiment, the airfoil flange and the flange of the first outer drum and the second outer drum each define an opening through which a mechanical fastener is disposed. The mechanical fastener retains the plurality of outer drum airfoils to the outer drum rotor assembly. In another embodiment, the first outer drum is disposed on an upstream side of the airfoil flange and the second outer drum is disposed on a downstream side of the airfoil flange.

In still various embodiments, the outer drum rotor assembly further includes a rotatable torque frame coupled to the outer drum rotor assembly. The torque frame includes an inner shroud and an outer shroud each defined annularly around an axial centerline, and a structural member extended along the radial direction and coupled to the inner shroud and the outer shroud. In one embodiment, the torque frame is coupled to a second flange of either the first outer drum or the second outer drum.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 7 is a schematic cross sectional view of another embodiment of the turbine section shown in FIG. 1.

Figure 1:
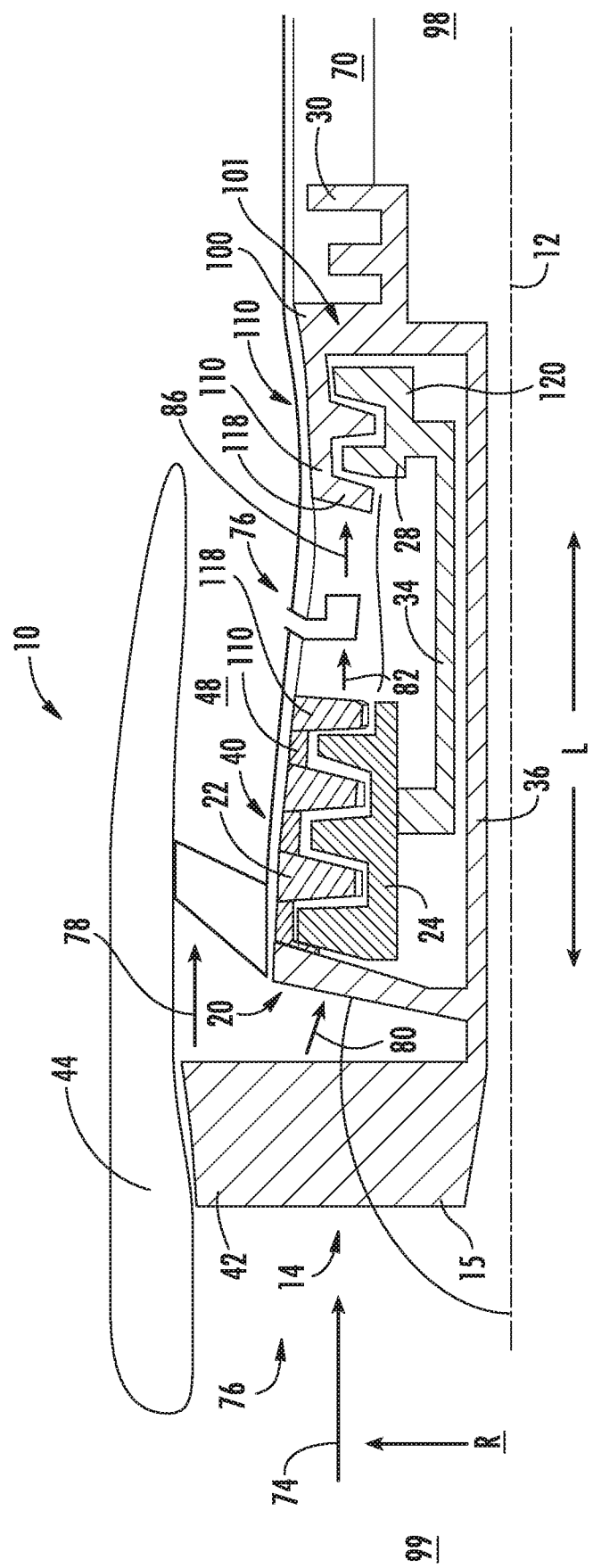
FIG. 1 is a schematic cross sectional view of an exemplary gas turbine engine incorporating an exemplary embodiment of a turbine section according to an aspect of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows. Unless otherwise stated, "downstream" and "upstream" refer to the general direction of fluid flow of air or resulting combustion gases through a core flowpath of the engine from entry into a compressor section through exit from a turbine section.

The terms "low", "intermediate", "high", or their respective comparative degrees (e.g. -er, where applicable) each refer to relative speeds within an engine, unless otherwise specified. For example, a "low turbine" or "low speed turbine" defines a rotational speed lower than a "high turbine" or "high speed turbine". Alternatively, unless otherwise specified, the aforementioned terms may be understood in their superlative degree. For example, a "low turbine" may refer to the lowest maximum rotational speed turbine within a turbine section, and a "high turbine" may refer to the highest maximum rotational speed turbine within the turbine section. References to an intermediate speed refer to a maximum rotational speed between the low speed and the high speed.

Various embodiments of an outer drum rotor assembly for a gas turbine engine are generally provided. The outer drum rotor assembly includes an outer drum rotor and a plurality of outer drum airfoils extended inward from the annular outer drum rotor assembly. An inner disk is generally coupled to the plurality of outer drum airfoils, providing radial support to the plurality of outer drum airfoils and the outer drum rotor of the outer drum rotor assembly. The outer drum rotor assembly provides axial and circumferential support to the outer drum rotor assembly.

The various embodiments of the outer drum rotor assembly generally provided herein enable a decreased radius of the outer drum rotor assembly. The outer drum rotor assembly may further improve a margin of one or more natural frequencies relative to various rotational speeds of the outer drum rotor assembly, including a maximum rotational speed. Still further, the outer drum rotor assembly generally provided herein may enable cantilevering or overhanging the outer drum rotor assembly forward or upstream of a second turbine rotor (e.g., a high speed or high pressure turbine rotor), such as to obviate the need or remove a turbine vane assembly between the combustion section and the turbine rotors.

An interdigitated compressor or turbine section may increase fuel efficiency, operational efficiency, and/or power output while reducing weight, part count, and/or packaging (e.g. radial and/or axial dimensions). For example, the interdigitated compressor or turbine section may enable increased bypass ratio and/or overall pressure ratio of the gas turbine engine, thereby increasing fuel efficiency, operational efficiency, and/or power output relative to other engines of similar power output and/or packaging. The interdigitated compressor or turbine section may further reduce stationary and/or rotating airfoil quantities, and thereby engine packaging and/or weight, while maintaining or improving efficiencies, performance, or power output. Still further, the interdigitated turbine section may reduce a product of axial flow area and the square of the rotational speed (the product referred to as "$AN^2$") while additionally reducing an average work factor per stage of the turbine section.

Referring now to the drawings, FIG. 1 is a schematic cross sectional view of an exemplary gas turbine engine 10 (herein referred to as "engine 10"), shown as a high bypass turbofan engine, incorporating an exemplary embodiment of a turbine section 90 according to an aspect of the present disclosure. Although further described below with reference to a turbofan engine, the present disclosure is also applicable to turbomachinery in general, including propfan, turbojet, turboprop, and turboshaft gas turbine engines, including marine and industrial turbine engines and auxiliary power units. As shown in FIG. 1, the engine 10 has a longitudinal or axial centerline axis 12 that extends there through for reference purposes. The engine 10 defines a longitudinal direction L, a radial direction R, an upstream end 99 and a downstream end 98 along the longitudinal direction L, and a circumferential direction C (shown in FIGS. 3-4).

In general, the engine 10 may include a substantially tubular outer casing 18 that defines an annular inlet 20. The outer casing 18 encases or at least partially flows, in serial flow arrangement along the longitudinal direction L, a compressor section 40, a combustion section 26, and an interdigitated turbine section 90 (herein referred to as "turbine section 90"). A fan assembly 14 is disposed generally forward or upstream 99 of the compressor section 40. In the embodiment shown in FIG. 1, the engine 10 defines a two-spool configuration in which the compressor section 40 includes a first compressor 22 and a second compressor 24 in alternating or interdigitated arrangement along the longitudinal direction L. The fan assembly 14 and the first compressor 22 are coupled to a first shaft 36 toward the upstream end 99 of the engine 10 and a first turbine rotor 100 is coupled to the first shaft 36 toward the downstream end 98 of the engine 10. The first compressor 22 and fan assembly 14 are driven by the first turbine rotor 100. The second compressor 24 is coupled to a second shaft 34 and a second turbine rotor 120 is coupled to the second shaft 34 toward the downstream end 98 of the engine 10. The second compressor 24 is driven by the second turbine rotor 120. In various embodiments, the first compressor 22 defines a low pressure (LP) compressor and the second compressor 24 defines a high pressure (HP) compressor. In still various embodiments, the first turbine rotor 100 may define a low speed turbine 30 and the second turbine rotor 120 may define a high speed turbine 28.

In other embodiments, the engine 10 may define a three-spool configuration in which the compressor section 40 defines a fan assembly 14 including a fan rotor 15, and the first compressor 22 and the second compressor 24. A third turbine rotor may define an intermediate speed turbine driving the first compressor defining an IP compressor. The first turbine rotor 100 defining the low speed turbine 30 is attached to the fan rotor 15, thus driving the fan assembly 14. In such an embodiment, the third turbine rotor may be disposed in interdigitation among the first turbine rotor 100 in addition to or in lieu of the second turbine rotor 120 defining the high speed turbine 28.

Referring back to FIG. 1, the fan assembly 14 includes at least one stage of a plurality of fan blades 42 coupled to the fan rotor 15. The plurality of fan blades 42 are coupled to and extend outwardly from the fan rotor 15 in the radial direction R. In various embodiments, the fan rotor 15 may include a plurality of stages of fan blades 42 along the longitudinal direction L. An annular fan casing or nacelle 44 circumferentially surrounds at least a portion of the fan assembly 14 and/or at least a portion of the outer casing 18. In one embodiment, the nacelle 44 may be supported relative to the outer casing 18 by a plurality of circumferentially-spaced outlet guide vanes or struts. At least a portion of the nacelle 44 may extend over an outer portion (in radial direction R) of the outer casing 18 so as to define a bypass airflow passage 48 therebetween.

In other embodiments, the fan assembly 14 may further include a speed reduction assembly disposed between the fan rotor 15 and a first shaft 36 coupled to the turbine section 90. The speed reduction assembly may reduce the rotational speed of the fan rotor 15 relative to the turbine rotor of the turbine section 90 to which the fan rotor 15 is attached via the first shaft 36.

Figure 2:
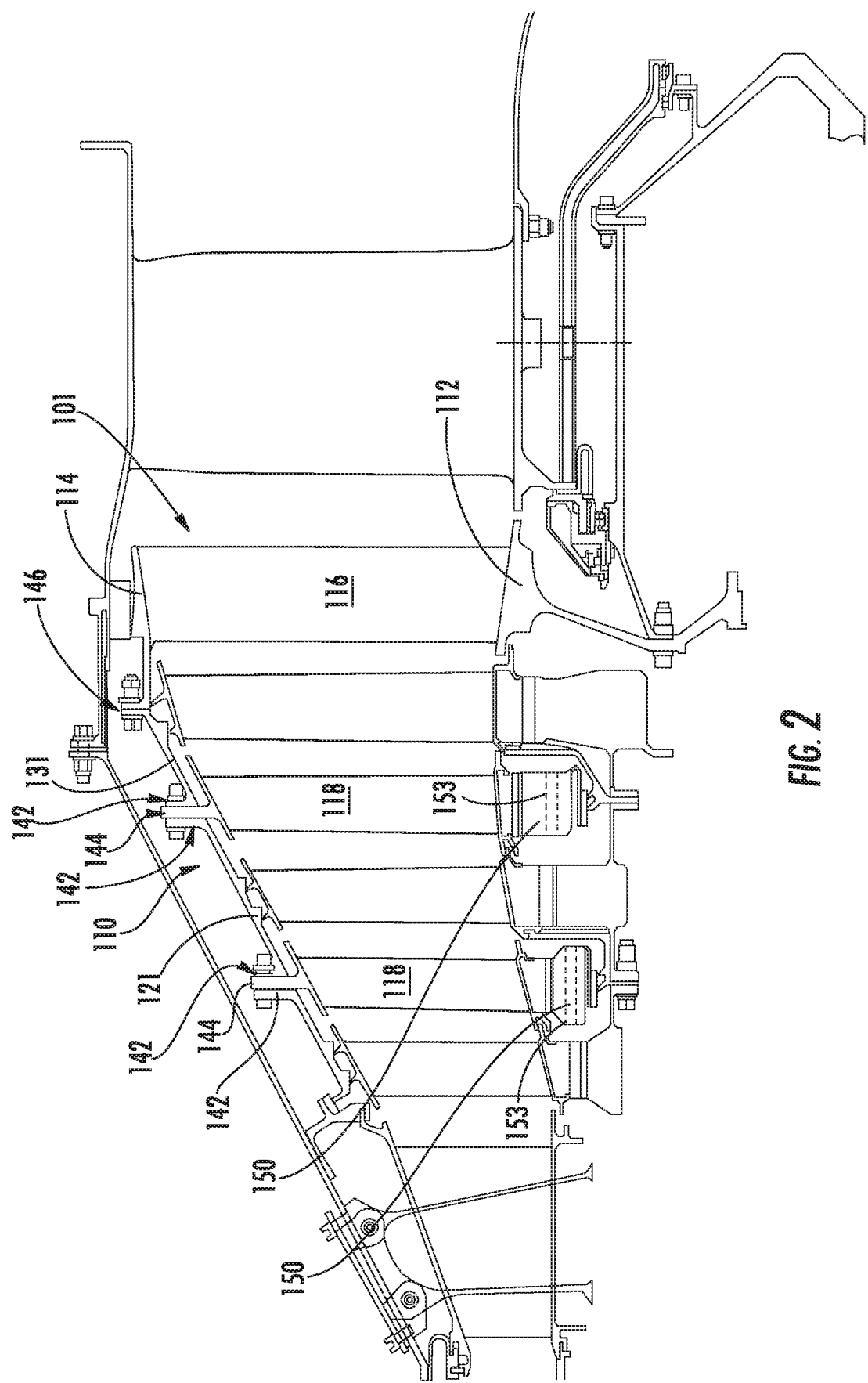
FIG. 2 is a schematic cross sectional view of an embodiment of the turbine section shown in FIG. 1.

Referring now to FIG. 2, an exemplary embodiment of the turbine section 90 of the engine 10 is generally provided. The turbine section 90 includes the first turbine rotor 100 and the second turbine rotor 120 in alternating arrangement along the longitudinal direction L (i.e., interdigitated). The first turbine rotor 100 includes an annular outer drum rotor assembly 110 extended along the circumferential direction around the axial centerline 12. The outer drum rotor assembly 110 is extended along the longitudinal direction L and at least partially surrounds the second turbine rotor 120.

The outer drum rotor assembly 110 defines a first outer drum 121 and a second outer drum 131. The first outer drum 121 and the second outer drum 131 each define a flange 142 extended along the radial direction R and adjacent to one another along the longitudinal direction L. As such, the first outer drum 121 and the second outer drum 131 each define portions of the outer drum rotor assembly 110 along the longitudinal direction L. Each of the first outer drum 121 and the second outer drum 131 are extended generally annularly around the axial centerline 12.

The outer drum rotor assembly 110 further includes a plurality of outer drum airfoils 118 extended inward along the radial direction R. The plurality of outer drum airfoils 118 is disposed in circumferential arrangement around the axial centerline 12. The outer drum airfoils 118 are further disposed between the first outer drum 121 and the second outer drum 131 at the flange 142. In various embodiments, the plurality of outer drum airfoils 118 are each coupled to the outer drum rotor assembly 110 between the first outer drum 121 and the second outer drum 131.

In one embodiment, the outer drum airfoils 118, the first outer drum 121, and the second outer drum 131 each define an opening 126 through which a mechanical fastener extends (e.g., a bolt or tie rod with nut, a screw, a rivet, a pin, etc.). The mechanical fastener couples each of the plurality of outer drum airfoils 118 to the first outer drum 121 and the second outer drum 131.

In other embodiments, the outer drum airfoils 118 may be coupled to the outer drum rotor assembly 110 via a joining process, such as, but not limited to, welding, brazing, soldering, or bonding.

Although the outer drum rotor assembly 110 is depicted in FIG. 2 as a portion of the turbine section 90, it should be appreciated that the outer drum rotor assembly 110 described herein may further apply to an interdigitated compressor section 40, such as generally shown in FIG. 1. For example, in one embodiment, the first compressor 22 includes the outer drum rotor assembly 110 disposing the plurality of outer drum airfoils 118 in alternating arrangement with the second compressor 24.

Figure 3:
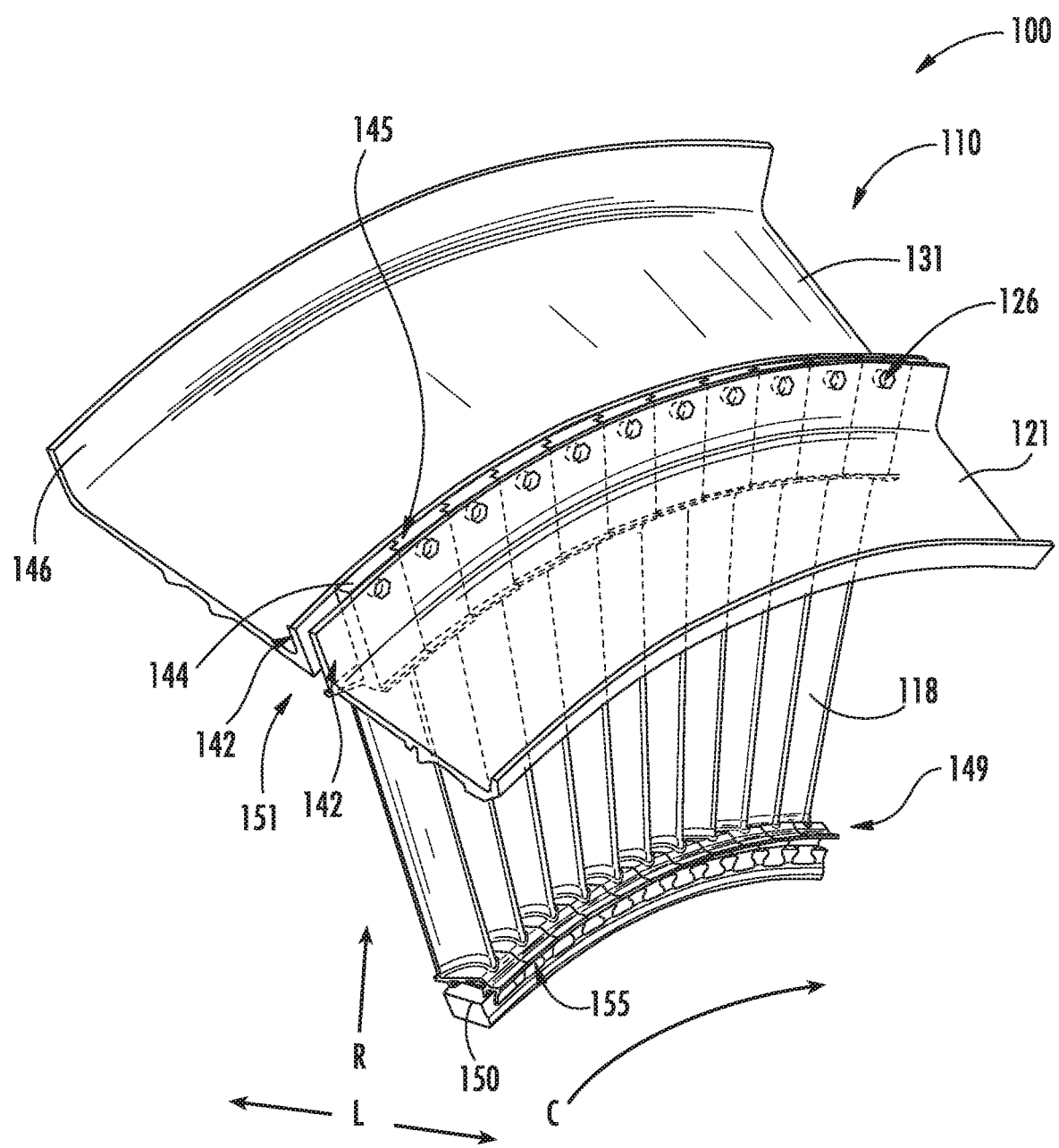
FIGS. 3-5 are perspective views of exemplary embodiments of portions of an outer drum rotor assembly generally provided in FIGS. 1-2.
Figure 4:
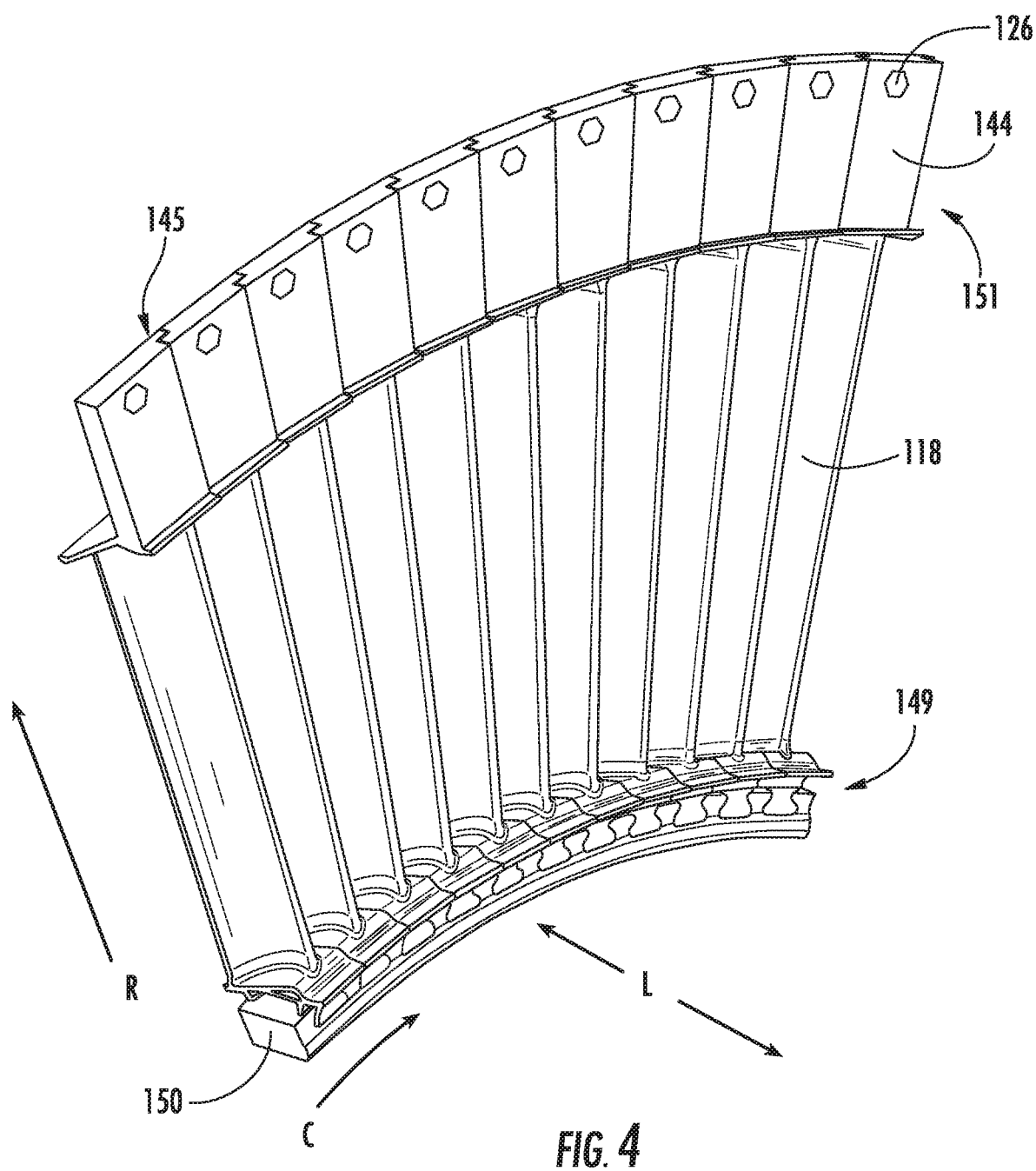

Referring now to FIGS. 3-4, perspective views of portions of the outer drum rotor assembly 110 are generally provided. FIG. 3 generally depicts the plurality of outer drum airfoils 118 disposed between the first outer drum 121 and the second outer drum 131. FIG. 4 generally depicts the plurality of outer drum airfoils 118. Referring to FIGS. 2-4, the outer drum airfoils 118 may each define an airfoil flange 144 extended along the radial direction R and at least partially along the circumferential direction C. Each airfoil flange 144 of each outer drum airfoil 118 may be disposed in adjacent circumferential arrangement to define a radially extended wall disposed along the longitudinal direction L between the first outer drum 121 and the second outer drum 131. The opening 126 may be defined through the airfoil flange 144 to retain the outer drum airfoils 118 to the outer drum rotor assembly 110 (e.g., via a mechanical fastener). It should be appreciated that the opening 126 is extended through each of the flange 142 at the first outer drum 121, the airfoil flange 144 at the outer drum airfoil 118, and the flange 142 at the second outer drum 131, such as to permit a mechanical fastener to provide axial or longitudinal, radial, and circumferential retention of the drums 121, 131 and airfoils 118 of the outer drum rotor assembly 110.

In one embodiment, the airfoil flanges 144 each define a joint 145 at which each adjacent airfoil flange 144 of each adjacent airfoil 118 is nested or at least partially overlapping along the circumferential direction C. In various embodiments, the joint 145 may define, but is not limited to, dovetails, tongue and groove, rabbets, box, lap, etc. In general, the joint 145 enables each pair of airfoil flanges 144 to at least partially overlap one another along the circumferential direction C.

In various embodiments, the outer drum rotor assembly 110 defines the first outer drum 121 disposed on an upstream side (e.g., toward the upstream end 99) of the airfoil flange 144 and the second outer drum 131 disposed on a downstream end (e.g., toward the downstream end 98) of the airfoil flange 144.

Referring now to FIG. 3-4, the outer drum rotor assembly 110 further includes a disk 150 coupled to an inner radius end 149 of the plurality of outer drum airfoils 118. In various embodiments, the disk 150 defines an integral annular structure, such as to provide structural support along the radial direction R to the plurality of outer drum airfoils 118. In one embodiment, the disk 150 defines a ring disk of a rotor. In another embodiment, the disk 150 defines a web disk, such as including a neck and bore portion. The disk 150 further provides tangential or circumferential support to the plurality of outer drum airfoils 118.

In various embodiments, the disk 150 is extended annularly around the axial centerline 12 and disposed at the inner radius end 149 of the plurality of outer drum airfoils 118. In one embodiment, the disk 150 and the outer drum airfoils 118 together define an integral structure. In another embodiment, the disk 150, the outer drum airfoils 118, and one or more of the first outer drum 121 and the second outer drum 131 together define an integral structure.

In still various embodiments, such as shown in FIG. 2, the disk 150 may define a cooling passage 153 extended therethrough at least partially along the longitudinal direction L. In one embodiment, the cooling passage 153 is extended at least partially along the circumferential direction. In another embodiment, the cooling passage 153 defines a serpentine structure through the disk 150. In still another embodiment, the cooling passage 153 is defined at least partially along the radial direction R. The various embodiments of the cooling passage 153 may further be defined in the disk 150 disposed in the turbine section 90 of the engine 10, such as to provide cooling to an inner radius end 149 of the outer drum rotor assembly 110.

In one embodiment, the disk 150 defines a plurality of slots 155 extended along the longitudinal direction L. The plurality of outer drum airfoils 118 is disposed through each slot 155 defined through the disk 150. Each slot 155 is generally discrete from one another arranged along the circumferential direction. In various embodiments, the slot 155 and the outer drum airfoil 118 together defines a dovetail joint. The plurality of slots 155 provides retention of the plurality of outer drum airfoils 118 along the circumferential direction C and the radial direction R.

Figure 5:
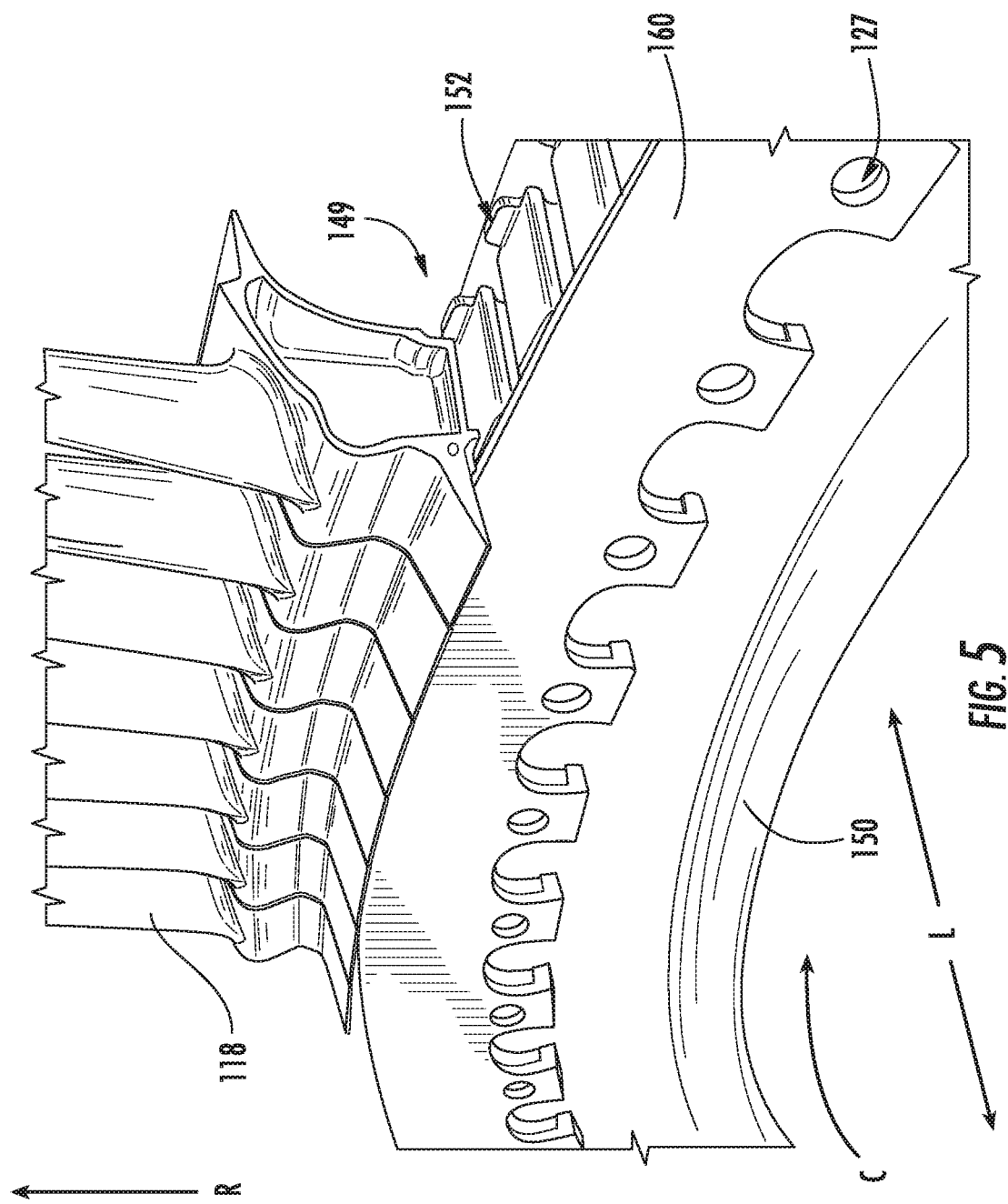

Referring now to FIG. 5, another perspective view of a portion of the outer drum rotor assembly 110 is generally provided. In the embodiment generally shown in FIG. 5, the disk 150 defines a first retaining wall 152 extended along the radial direction R. The first retaining wall 152 is disposed adjacent along the longitudinal direction L to the inner radius end 149 of the plurality of outer drum airfoils 118. The first retaining wall 152 provides retention of the plurality of outer drum airfoils 118 along the longitudinal direction L.

In one embodiment, the first retaining wall 152 is defined as a plurality of discrete walls separate from one another along the circumferential direction C. In various embodiments, the first retaining wall 152 defines a quantity of discrete first retaining walls 152 corresponding to a quantity of outer drum airfoils 118 disposed through the disk 150.

Referring still to FIG. 5, the outer drum rotor assembly 110 further includes a retaining ring 160 coupled to the disk 150. The retaining ring 150 defines a wall extended along the circumferential direction C and along the radial direction R adjacent along the longitudinal direction L to the plurality of outer drum airfoils 118. The retaining ring 160 provides retention of the plurality of outer drum airfoils 118 along the longitudinal direction L.

In various embodiments, the retaining ring 160 and the disk 150 each define an opening 127 through which a mechanical fastener is disposed to couple the retaining ring 160 to the disk 150. In other embodiments, the retaining ring 160 is coupled to the disk 150 via a joining process (e.g., welding, brazing, soldering, etc.). The retaining ring 160 and the retaining wall 152 together provide retention of the outer drum airfoils 118 to the disk 150 along the longitudinal direction L. The slots 155, such as defining a dovetail joint, provide circumferential and radial retention of the outer drum airfoils 118 to the disk 150.

The disk 150 may generally act as a cylindrical hoop or drum providing structural support to react against radial loads from the outer drum airfoils 118, the first outer drum 121, and the second outer drum 131. The first outer drum 121 and the second outer drum rotor 131 provide structural support to react against or transfer torque and axial/longitudinal loads. The disk 150 defined at the inner radius end 149 of the outer drum airfoils 118 may further improve a response spectrum of the outer drum rotor assembly 110 over its oscillation regime. For example, the disk 150 may improve a margin between one or more natural frequencies of vibration and a maximum rotational speed of the first turbine rotor 100.

It should be appreciated that although the present disclosure includes a first outer drum 121 and a second outer drum 131, one or more additional outer drums may be included in serial arrangement such as generally shown in FIGS. 1, 2, and 7 to define multiple stages of the plurality of outer drum airfoils 118 coupled between the first outer drum 121 and the second outer drum 131.

Referring now to FIGS. 1-5, during operation of the engine 10 a volume of air as indicated schematically by arrows 74 enters the engine 10 through an associated inlet 76 of the nacelle and/or fan assembly 14. As the air 74 passes across the fan blades 42, a portion of the air as indicated schematically by arrows 78 is directed or routed into the bypass airflow passage 48 while another portion of the air as indicated schematically by arrows 80 is directed through the fan assembly 14 and through the inlet 20. The air 80 is progressively compressed as it flows through the compressor section 40 toward the combustion section 26.

The now compressed air, as indicated schematically by arrows 82, flows into the combustion section 26 where a fuel is introduced, mixed with at least a portion of the compressed air 82, and ignited to form combustion gases 86. The combustion gases 86 flow into the turbine section 90, causing the first turbine rotor 100 and second turbine rotor 120, and in various embodiments, the third turbine rotor, of the turbine section 90 to rotate and support operation of respectively coupled rotary members in the compressor section 40 and/or fan assembly 14.

Figure 6:
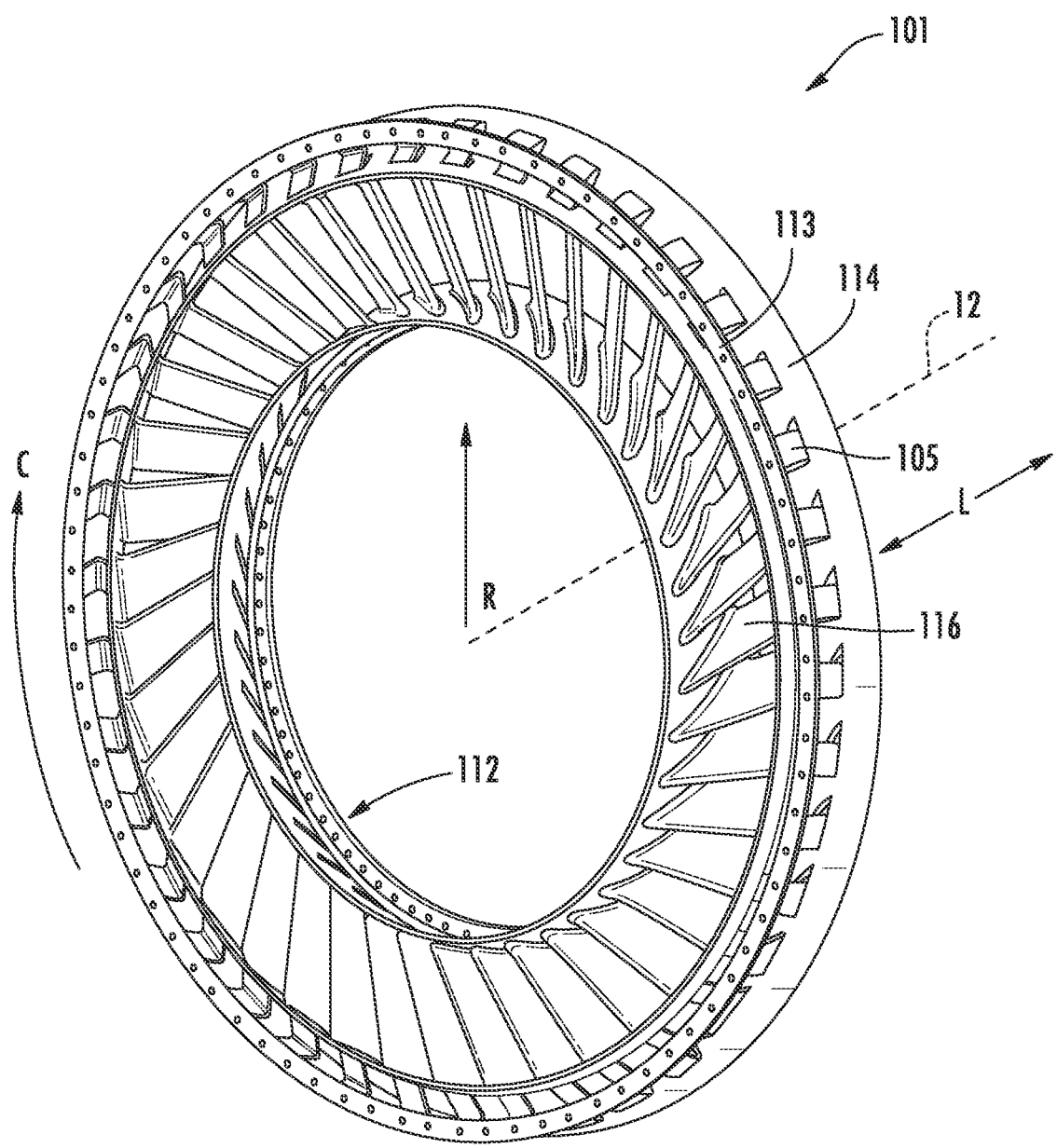
FIG. 6 is a perspective view of an exemplary embodiment of a torque frame of the outer drum rotor assembly generally provided in FIGS. 1-2.

Referring now to FIGS. 2 and 6, the first turbine rotor 100 further includes a torque frame 101 coupled to the outer drum rotor assembly 110. In various embodiments, the first outer drum 121 or the second outer drum 131 defines a second flange 146 extended along the radial direction R and at least partially along a circumferential direction to which the torque frame 101 is coupled. In various embodiments, the torque frame 101 is coupled to a downstream end of the second outer drum 131, such as generally shown in FIG. 2. In other embodiments, the torque frame 101 is coupled to an upstream end of the first outer drum 121. In still other embodiments, the torque frame 101 is defined between the first outer drum 121 and the second outer drum 131, such that the outer drum rotor assembly 110 is extended upstream and downstream of the torque frame 101.

Referring to FIG. 6, an exemplary embodiment of the torque frame 101 is generally provided. The torque frame 101 includes an inner shroud 112 and an outer shroud 114 outward of the inner shroud 112 in the radial direction R. At least one structural member 116 couples the inner shroud 112 and the outer shroud 114 at least partially in the radial direction R. In various embodiments, such as generally shown in FIGS. 1 and 7, an inner drum rotor 111 may be coupled to the inner shroud 112 of the torque frame 101 and extended along the longitudinal direction L.

In various embodiments, the outer drum airfoils 118 and the structural members 116 each define an airfoil defining a pressure side, a suction side, a leading edge, and a trailing edge. The structural member 116 defining the airfoil is generally configured to enable rotation of the torque frame 101. For example, the torque frame 101, as a portion of the outer drum rotor assembly 110, is configured to rotate along the axial centerline 12, such as in a first direction at a first speed co-rotational with the first outer drum 121, the second outer drum 131, and an inner drum rotor 111 (FIG. 7).

The inner drum rotor 111 may be coupled to an inner radius end 149 of the torque frame 101 and extended along the longitudinal direction L (e.g., toward the downstream end 98). In various embodiments, the inner drum rotor 111 may include a plurality of ring or web disks coupled to one another along the longitudinal direction L. For example, the inner drum rotor 111 may include a plurality of integrally bladed rotors or bladed disks including airfoils attached thereto and extended outward along the radial direction R through the flowpath 70.

Referring now to FIG. 7, a schematic cross sectional view of another exemplary embodiment of the turbine section 90 is generally provided. In the embodiment generally depicted, the outer drum airfoils 118, structural member 116, or both, may define a lean angle 109 relative to the axial centerline 12 and the radial direction R. In one embodiment, such as shown in FIG. 7, the lean angle 109 is defined in which an outer radius end 151 of the outer drum airfoils 118, structural member 116, or both is disposed upstream of an inner radius of the outer drum airfoils 118, the structural member 116, or both. For example, the lean angle 109 may be defined as approximately 90 degrees or greater relative to the axial centerline 12. In another embodiment, the lean angle 109 is less than approximately 180 degrees relative to the axial centerline 12. In still various embodiments, the lean angle 109 may be approximately 90 degrees or perpendicular relative to the axial centerline 12.

In the embodiment shown in FIG. 2, the outer drum airfoils 118, the structural member 116, or both, may define an obtuse or forward lean angle 109 in which the structural member 116 is extended toward the upstream end 99 from the inner shroud 112 (i.e. radially inward end 149 of the outer drum airfoil 118, the structural member 116, or both, is further downstream than a radially outward end 151). The obtuse or forward lean angle 109 may counteract or offset centrifugal loads on the torque frame 101 during rotation of the turbine section 90. The obtuse lean angle 109 may enable the outer drum airfoil 118, the structural member 116, or both to counteract or offset axial loads during operation of the engine 10, such as due to rotation of the first turbine rotor 100 including the torque frame 101 and one or more of the outer drum rotor 110 and the inner drum rotor 111. The obtuse lean angle 109 may further enable the structural member 116 to counteract or offset axial loads resulting from the flow of combustion gases 86 through the core flowpath 70.

In other embodiments, such as generally provided in FIG. 2, the structural members 116 and/or the outer shroud airfoils 118 may each define a generally perpendicular or acute lean angle 109 in which one or more of the structural members 116 and/or the outer shroud airfoils 118 extend generally radially outward from the axial centerline 12 or toward the upstream end 99 (i.e. radially inward ends of the airfoils 116, 118 are approximately equal to or further upstream than radially outward ends).

As further described herein, the torque frame 101 is configured to extract work or energy from the combustion gases 86 to enable rotation of the torque frame 101, the first outer drum rotor 121, the second outer drum rotor 131, and the inner drum rotor 111. Still further, the torque frame 101, such as the structural members 116, is configured to transfer reaction loads from combustion gases 86 within the core flowpath 70 of the engine 10, such as loads along the longitudinal direction L. The structural members 116 further transfer loads along the radial direction R and the circumferential direction C from the inner shroud 112, and the inner drum rotor 111 attached thereto, and the outer shroud 114, and the outer drum rotors 121, 131 attached thereto.

Referring still to the exemplary embodiment of the torque frame 101 provided in FIG. 6, an outer band 113 is coupled to the outer shroud 114 and disposed outward in the radial direction R thereof. The outer band 113 is extended at least partially in the circumferential direction C. In various embodiments, the outer band 113 extends annularly around the outer shroud 114 of the torque frame 101. The outer band 113 coupled to the outer shroud 114 further provides structural support, such as defining an annular ring surrounding the outer shroud 112 to which the outer drum rotor 121, 131 is coupled and extended along the longitudinal direction L. In still various embodiments, the torque frame 101 further includes connecting members 105 extended at least partially along the radial direction coupling the outer shroud 114 to the outer band 113. The connecting members 105 may further transfer loads from the inner shroud 112 and inner drum rotor 111, the structural members 116, and the outer shroud 114 and outer drum rotor 121, 131 to the outer band 113.

In various embodiments, the second outer drum 131 is coupled to the outer band 113 of the torque frame 101, such as at a downstream end of the second outer drum 131. The outer drum rotor assembly 110, or more specifically, the outer drum rotors 121, 131 may be generally cantilevered or overhung along the longitudinal direction L from the outer band 113. The disk 150 of the outer drum rotor assembly 110 may attenuate undesired vibratory modes. Additionally, the torque frame 101, such as including the connecting members 105, may further attenuate undesired vibratory modes such as to enable high speed rotation of the outer drum rotor assembly 110. Still further, the disk 150 may further enable the outer drum rotor assembly 110 to be overhung forward or upstream of the second turbine rotor 120, such as to obviate the presence or need for a turbine vane nozzle between the combustion section 26 and the turbine rotors of the turbine section 90.

The torque frame 101 may define a structural support for the outer drum rotor 110 that may enable the outer drum rotor assembly 110 to be overhung or cantilevered. The connecting members 105 may define springing properties configured to attenuate undesired engine dynamics. The connecting members 105 may further provide radial growth, movement, or displacement of the structural members 116 while the outer band 113 provides structural stiffness. The connecting members 105 may transfer thermal and mechanical loads, such as loads along the axial or longitudinal direction L, loads along the radial direction R, and/or twisting, bending, vibrational, or torsional loads along the longitudinal direction L, the radial direction R, and/or the circumferential direction C. Still further, the connecting members 105 may attenuate the high temperature gradient within a secondary flowpath of the turbine section 90 defined between the outer shroud 114 and outer drum rotor assembly 110.

In various embodiments, during operation of the engine 10, the outer drum rotor assembly 110 including one or more of the disk 150, the connecting members 105 from the outer shroud 114 to the outer band 113 may transfer thermal, axial, radial, and mechanical loads to the outer band 113 while providing adequate radial stiffness to support an overhung or cantilevered outer drum rotor assembly 110 for the interdigitated turbine section 90 or compressor section 40. Still further, the outer band 113 may provide sufficient stiffness to attenuate undesired vibratory modes, harmonics, or noise and/or generally promote desired engine dynamics.

The outer drum rotor assembly 110, or portions or combinations of portions thereof, may be formed using additive manufacturing or 3D printing, or casting, forging, machining, or castings formed of 3D printed molds, or combinations thereof. The outer drum rotor assembly 110, or portions thereof, such as stages of the plurality of outer drum rotors 118, one or more of the first outer drum 121, the second outer drum 131, the disk 150, and the torque frame 101, and other portions may be mechanically joined using fasteners, such as nuts, bolts, screws, pins, or rivets, or using joining methods, such as welding, bonding, friction or diffusion bonding, etc., or combinations of fasteners and/or joining methods.

The embodiments of the outer drum rotor assembly 110 generally described herein may further enable interdigitation of the outer drum rotor assembly 110 with the second turbine rotor 120, including forward or upstream of the second turbine rotor 120 (e.g., a high pressure or high speed turbine rotor) to enable the outer drum rotor assembly 110 (e.g., as a low speed turbine rotor), or more specifically, at least a stage of the plurality of outer drum airfoils 118, to be immediately downstream of the combustion section 26. As such, the ring 150, the torque frame 101, or combinations thereof may obviate the need or presence of a first turbine vane or nozzle downstream of the combustion section 26, thereby improving turbine section 90 performance and/or efficiency, engine 10 performance, operability, and/or efficiency, and/or reduce weight, part count, and/or packaging (e.g. longitudinal and/or radial dimensions) of the engine 10. In still various embodiments, the torque frame 101 may provide structural support enabling the overhung or cantilevered outer drum rotor assembly 110 and the inner drum rotor 111 extended at least partially in an opposite direction along the longitudinal direction L.

The turbine section 90 and the compressor section 40 shown and described herein may improve upon existing turbine sections by providing improved fuel efficiency, operational efficiency, and/or power output while maintaining or reducing weight, part count, and/or packaging. The plurality of outer drum airfoils 118 interdigitated among the second turbine rotor(s) 120, the second compressor 24, or both, may reduce packaging and reduce part count by removing stages of stationary airfoils between each rotating component.

Additionally, the turbine section 90 may provide efficiency benefits comparable to a reduction gearbox without adding weight or size (e.g. axial length) to the engine 10. For example, the outer drum rotor assembly 110 in the turbine section 90, as a first stage downstream of the combustion section 26, may further improve engine efficiency by removing design constraints to the combustion section 26 that may account for combustor hot spots. Furthermore, the turbine section 90 may improve engine 10 efficiency by reducing requirements for cooling air, generally extracted from the compressor section 40 and often considered to remove potential propulsive energy from the engine 10.

The systems shown in FIGS. 1-7 and described herein may decrease fuel consumption, increase operability, increase engine performance and/or power output while maintaining or reducing weight, part count, and/or packaging (e.g. radial and/or axial dimensions). The systems provided herein may allow for increased bypass ratios and/or overall pressure ratios over existing gas turbine engine configurations, such as turbofans, while maintaining or reducing packaging relative to other gas turbine engines of similar power output. The systems described herein may contribute to improved bypass ratio and/or overall pressure ratio and thereby increase overall gas turbine engine efficiency. The systems provided herein may increase overall gas turbine engine efficiency by reducing or eliminating stationary airfoils that require cooling air (e.g. nozzle guide vane). Additionally, the systems provided herein may reduce gas turbine engine packaging and weight, thus increasing efficiency, by reducing rotating and/or stationary airfoil quantities (e.g. blades and/or vanes).

Still further, the systems shown in FIGS. 1-7 and described herein may reduce a product of a flow area and the square of the rotational speed (the product herein referred to as "$AN^2$") of the gas turbine engine. For example, engine 10 shown and described in regard to FIGS. 1-7 may generally reduce $AN^2$ relative to a conventional geared turbofan configuration. Generally, lowering the $AN^2$, such as by reducing the rotational speed and/or the flow area, increases the required average stage work factor (i.e. the average required loading on each stage of rotating airfoils). However, the systems described herein may lower the $AN^2$ while also lowering the average stage work factor and maintaining axial length of the turbine section 90 (compared to engines of similar thrust output and packaging) by interdigitating the first turbine rotor 100 among the one or more stages of the second turbine rotor 120 while also defining a non-digitated turbine structure (i.e. the inner shroud 111) toward the downstream end 98 of the turbine section 90. Therefore, the first turbine rotor 100 and second turbine rotor 120 may together increase the quantity of rotating stages of airfoils while reducing the average stage work factor, and therefore the $AN^2$, while mitigating increases in axial length to produce a similar $AN^2$ value. The first turbine rotor 100 may further reduce the $AN^2$ while additionally reducing the overall quantity of airfoils, rotating and stationary, in the turbine section 90 relative to turbine sections of gas turbine engines of similar power output and/or packaging.

Furthermore, the systems shown in FIGS. 1-7 and described herein may further improve engine efficiency, reduce airfoil quantity, reduce engine weight, and/or alleviate combustion section design constraints by interdigitating the first turbine rotor 100 forward or upstream 99 of the second rotating component 120 defining the high speed turbine 28. For example, defining the first stage of the first turbine rotor 100 as immediately downstream 98 of the combustion section 26, without a first turbine vane or nozzle guide vane therebetween, as well as defining the first turbine rotor 100 in counter-rotation with the second rotating component 120, may reduce effects of overall combustion hot spots on the first stage of the first turbine rotor 100 in contrast to a stationary, first turbine vane or nozzle guide vane. As such, the turbine section 90 and engine 10 described herein may remove constraints to combustion section 26 design by de-emphasizing hot spots, or combustion pattern factor, in favor of other design criteria, such as decreasing emissions, improving lean blow-out (LBO) and/or altitude re-light, improving overall operability across part or all of an operating envelope, or increasing the operating envelope.

Still further, the systems shown in FIGS. 1-7 and described herein may enable interdigitation of the first compressor 22 and the second compressor 24, such as to remove or obviate a need for stationary vanes between rotating stages, thereby reducing part quantity, engine packaging, such as axial and/or radial dimensions, and weight, and improving engine 10 performance and efficiency.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An outer drum rotor assembly for a gas turbine engine, the outer drum rotor assembly defining a radial direction, a circumferential direction, and a longitudinal direction, the outer drum rotor assembly comprising:
 a first outer drum comprising a first radially extended flange;
 a second outer drum comprising a second radially extended flange adjacent to the first radially extended flange; and
 first and second outer drum airfoils that are adjacent to each other and each extended inward along the radial direction from between the first radially extended flange at the first outer drum and the second radially extended flange at the second outer drum,
 wherein the first and second outer drum airfoils respectively comprise first and second airfoil flanges extended outward along the radial direction and at least partially along the circumferential direction,
 wherein the first and second airfoil flanges are positioned between the first radially extended flange at the first outer drum and the second radially extended flange at the second outer drum,
 wherein the first and second airfoil flanges are arranged side by side in the circumferential direction,
 wherein a first side of the first airfoil flange and a second side of the second airfoil flange are joined to each other at a joint,
 wherein the joint is formed by a first circumferential joint extension of the first airfoil flange that extends towards the second airfoil flange on a downstream end of the first airfoil flange and a second circumferential joint extension of the second airfoil flange that extends towards the first airfoil flange on an upstream end of the second airfoil flange, and
 wherein the first and second circumferential joint extensions overlap each other in the longitudinal direction such that the first and second circumferential joint extensions contact each other in the longitudinal direction.

2. The outer drum rotor assembly of claim 1, comprising:
 a disk coupled to inner diameters of the first and second outer drum airfoils.

3. The outer drum rotor assembly of claim 2,
 wherein the disk comprises a first retaining wall extended along the radial direction,
 wherein the first retaining wall is positioned adjacent along the longitudinal direction to the first and second outer drum airfoils, and
 wherein the first retaining wall provides retention of the first and second outer drum airfoils along the longitudinal direction.

4. The outer drum rotor assembly of claim 2, wherein the disk defines comprises a cooling passage extended therethrough at least partially along the longitudinal direction.

5. The outer drum rotor assembly of claim 2, comprising:
 a retaining ring coupled to the disk,
 wherein the retaining ring comprises a wall extended along the circumferential direction and along the radial direction,
 wherein the wall is positioned adjacent along the longitudinal direction to the first and second outer drum airfoils, and
 wherein the retaining ring provides retention of the first and second outer drum airfoils along the longitudinal direction.

6. The outer drum rotor assembly of claim 2,
 wherein the disk comprises slots extended along the longitudinal direction through which the first and second outer drum airfoils are positioned, and
 wherein the slots provide retention of the first and second outer drum airfoils along the circumferential direction and the radial direction.

7. The outer drum rotor assembly of claim 2, wherein the disk is an integral annular structure.

8. The outer drum rotor assembly of claim 2, wherein the first and second outer drum airfoils are extended along the radial direction at an angle relative to an axial centerline.

9. The outer drum rotor assembly of claim 8, wherein outer radial ends of the first and second outer drum airfoils are positioned upstream along the longitudinal direction relative to inner radial ends of the first and second outer drum airfoils.

10. The outer drum rotor assembly of claim 1,
 wherein the first outer drum airfoil, the first outer drum, and the second outer drum each form an opening through which a mechanical fastener extends,
 wherein the mechanical fastener couples together the first outer drum airfoil, the first outer drum, and the second outer drum.

11. The outer drum rotor assembly of claim 1,
 wherein the first airfoil flange, the first radially extended flange, and the second radially extended flange each form an opening through which a mechanical fastener is positioned,
 wherein the mechanical fastener retains the first outer drum airfoil to the outer drum rotor assembly.

12. The outer drum rotor assembly of claim 1,
 wherein the first outer drum is positioned on an upstream side of the first and second airfoil flanges, and
 wherein the second outer drum is positioned on a downstream side of the first and second airfoil flanges.

13. The outer drum rotor assembly of claim 1, comprising:
 a rotatable torque frame coupled to the outer drum rotor assembly,
 wherein the torque frame comprises an inner shroud and an outer shroud each extended annularly around an axial centerline, and
 wherein the torque frame comprises a structural member extended along the radial direction and coupled to the inner shroud and the outer shroud.

14. The outer drum rotor assembly of claim 13,
 wherein the outer drum rotor assembly comprises a third flange positioned at one or more of the first outer drum or the second outer drum, and
 wherein the torque frame is coupled to the third flange.

15. A gas turbine engine, the gas turbine engine defining a radial direction, a circumferential direction, and a longitudinal direction, comprising:

an outer drum rotor assembly comprising:
- an annular outer drum rotor assembly comprising a first outer drum comprising a first radially extended flange;
- a second outer drum comprising a second radially extended flange adjacent to the first radially extended flange; and
- a plurality of outer drum airfoils extended inward along the radial direction from between the first radially extended flange at the first outer drum and the second radially extended flange at second outer drum, wherein the plurality of outer drum airfoils comprises first and second outer drum airfoils that are adjacent to each other, wherein the first and second outer drum airfoils respectively comprise first and second airfoil flanges extended outward along the radial direction and at least partially along the circumferential direction, wherein the first and second airfoil flanges are positioned between the first radially extended flange at the first outer drum and the second radially extended flange at the second outer drum, wherein the first and second airfoil flanges are arranged side by side in the circumferential direction, wherein a first side of the first airfoil flange and a second side of the second airfoil flange are joined to each other at a joint, wherein the joint is formed by a first circumferential joint extension of the first airfoil flange that extends towards the second airfoil flange on a downstream end of the first airfoil flange and a second circumferential joint extension of the second airfoil flange that extends towards the first airfoil flange on an upstream end of the second airfoil flange, and wherein the first and second circumferential joint extensions overlap each other in the longitudinal direction such that the first and second circumferential joint extensions contact each other in the longitudinal direction.

16. The gas turbine engine of claim 15, wherein the outer drum rotor assembly comprises:
- a disk coupled to inner diameters of the plurality of outer drum airfoils,
- wherein the disk is rotatable with the outer drum rotor assembly.

17. The gas turbine engine of claim 16, comprising:
- a retaining ring coupled to the disk,
- wherein the retaining ring comprises a wall extended along the circumferential direction and along the radial direction,
- wherein the wall is positioned adjacent along the longitudinal direction to the plurality of outer drum airfoils, and
- wherein the retaining ring provides retention of the plurality of outer drum airfoils along the longitudinal direction.

18. The gas turbine engine of claim 15,
wherein the outer drum rotor assembly comprises:
- a rotatable torque frame coupled to the outer drum rotor assembly,
- wherein the torque frame comprises an inner shroud and an outer shroud each extended annularly around an axial centerline, and
- wherein the torque frame comprises a structural member extended along the radial direction and coupled to the inner shroud and the outer shroud.

19. The gas turbine engine of claim 18, wherein outer radial ends of the first and second outer drum airfoils and the structural member are positioned upstream along the longitudinal direction relative to inner radial ends of the first and second outer drum airfoils.

* * * * *